United States Patent Office 3,044,855
Patented July 17, 1962

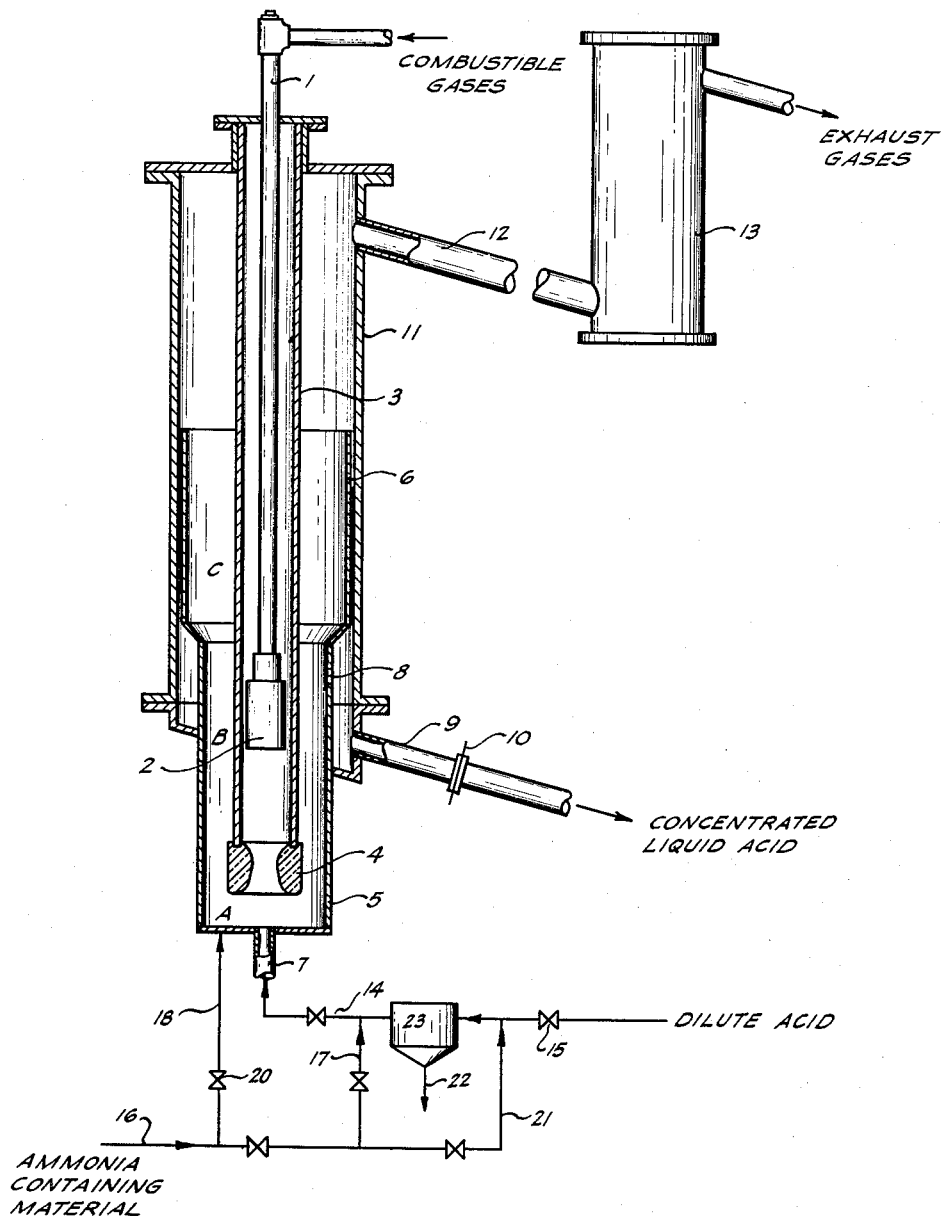

3,044,855
CONCENTRATION OF WET-PROCESS PHOSPHORIC ACID
Donald C. Young, Fullerton, Calif., assignor, by mesne assignments, to Collier Carbon and Chemical Corporation, a corporation of California
Filed Dec. 14, 1959, Ser. No. 859,320
5 Claims. (Cl. 23—165)

This invention relates to the concentration of wet-process phosphoric acid containing organic impurities, and comprises the addition of ammonia or ammonium salts to the acid to prevent foaming during heating.

Wet-process phosphoric acid is produced by treating phosphate rock with a strong mineral acid and freeing the acid thus formed from metal salts formed from the treating acid. Frequently, the organic matter present in the phosphate rock is not removed prior to treatment, and consequently is present in the phosphoric acid product along with the silica and fluorine compounds and the carbonates, sulfates and phosphates of calcium, iron, aluminum and magnesium normally present as impurities in the acid. In some instances, organic materials are added to the crude acid as part of a treatment for the recovery of uranium. When the wet-process acid containing organic impurities is concentrated by heating, it foams severely, interfering with the heating operation and coating the walls of the containing vessel with a thick foam deposit. This difficulty, encountered in all methods of heating the acid, is extremely troublesome when submerged combustion heating is employed. In this method, hot combustion gases are discharged into direct contact with the acid and the resulting turbulent mixing of the acid and gases is very conducive to the formation of foam which fills the vapor spaces and deposits as a hard coating on the hot walls of the combustion tube.

It is a purpose of this invention to avoid the formation of foam during the heating and evaporative concentration of phosphoric acid. This is achieved by the addition of ammonia or inorganic ammonium salts to the acid in a sufficient amount to provide between about 0.25 and 5.0 weight percent nitrogen in the dilute wet-process acid. By reason of its low cost and ease of handling, the additive is preferably ammonia, but inorganic ammonium salts may be employed if desired. Suitable ammonium salts include mono- and diammonium phosphate, ammonium sulfate, ammonium nitrate, ammonium carbonate, ammonium chloride, ammonium bromide, ammonium silicate, etc. Of such ammonium salts, those of a strong inorganic acid, e.g., sulfuric acid, hydrochloric acid, nitric acid, phosphoric acid, and the like, are preferred.

In addition to reducing the formation of foam during heating, the addition of ammonia or an ammonium salt to the acid reduces the stability of the slight amounts of foam formed so that it disperses upon cessation of heating. It has also been observed that the concentrated acid produced from an ammoniated feed is an improved product because it contains much less black particulate matter than is commonly found in a concentrated wet-process acid.

Procedure-wise, the ammonia or ammonium salt is added by intimately admixing it with the acid prior to or during the heating operation. For instance, the additive can be added batchwise with stirring to the dilute acid in the storage tanks, or added continuously to the stream of cold acid feed to the heater, or to the acid in the heating vessel. When an ammonia salt is used, it can be added to the acid as a solid or as an aqueous salt solution.

The drawing illustrates a heater adapted to the evaporative concentration of phosphoric acid and in which the problem of foaming has caused difficulty. This heater comprises a combustible gas supply conducit 1, suitable ignition means, not shown, and a burning chamber 2, which is concentrically disposed within a surrounding conduit 3, hereafter referred to as a dip tube. The latter extends a substantial distance below the burning chamber and is fitted at its lower end with a constricting nozzle 4. The dip tube is in turn surrounded by a concentric subjacent conduit 5, which is closed at its lower end and terminates with its upper end in open communication with a disengaging chamber 6 of substantially greater diameter and also concentrically surrounding the dip tube. A liquid feed inlet 7 is provided through the bottom plate of conduit 5 and a product outlet 8 is tapped into the upper end of this conduit. The entire assembly is supported within an encompassing cylindrical shell 11, which has a conduit 9 attached to its lower end for product acid withdrawal. Positioned within conduit 9 is metal screen 10 to filter solid particles from the acid. Exhaust gas conduit 12 is attached to the upper end of shell 11 and leads to an entrainment separator 13.

In operation, a premixed stream of natural gas and air is supplied to the burning chamber and ignited. The resultant hot combustion gases flow from the burning chamber into the surrounding dip tube and through nozzle 4 and into direct contact with the liquid feed in zone A. The resultant mixed liquid and gas stream reverses direction and flows upwardly through annulus B between the dip tube and conduit 5, which is sized sufficiently small in area in relation to the flow rates that the gas exerts a lifting effect on the liquid. The mixed liquid and gas stream discharges from the upper open end of conduit 5 into the disengaging zone C within chamber 6. In this latter chamber, the gas and liquid separate; the gas is removed overhead, is passed through entrainment and aerosol separator 13, and is exhausted to the atmosphere. The liquid in zone C flows back into contact with the fluid in the annulus. A continuous bleed stream of liquid is removed as product through outlet tap 8, composed in part of liquid which is thrown into the outlet due to the turbulence of flow in the annulus and in part of the liquid filming down the inner wall of conduit 5. The concentrated liquid acid is withdrawn through conduit 9, strained through screen 10 and pumped to storage. As illustrated in the figure, ammonia or an ammonia salt can be added to the dilute acid feed stream or to the acid in the concentrator. When continuous addition is practiced, it is preferred to add the ammonia-containing material through conduit 17 into conduit 14 where the turbulence of flow will assure adequate mixing; however, it is not outside the scope of the invention to add the material directly to the concentrator through line 18. When ammonia or ammonium salt addition causes separation of objectionable amounts of silt it is preferred to add the material through line 21 and pass the treated acid to a settling vessel or clarifier 23, from where the silt is removed by line 22, and the clarified acid is fed to the concentrator. The following will exemplify the invention:

*Example 1*

About 1.92 weight percent ammonia was added to a typical wet-process phosphoric acid having a $P_2O_5$ content about 51 weight percent, 5 percent impurities and 0.24 percent carbon. Slight amounts of silt separated by this ammonia addition were permitted to settle and the clarified acid was concentrated in a device of the type previously described in connection with the drawing to obtain a product having 2.4 weight percent nitrogen calculated as ammonia and a $P_2O_5$ content on an ammonia-free basis of about 68 weight percent. During the concentration no difficulty was experienced in operation of the apparatus and only slight amounts of solid matter were found on the product withdrawal screen 10. An inspection of the apparatus after the test revealed only slight amounts of foam on the walls of the apparatus.

When the apparatus was employed to concentrate wet-process acid containing no ammonia or ammonium salts, extreme foaming occurred which obstructed the product outlet 8, and required frequent cleaning of screen 10. After a continuous run period of comparative length as with the ammoniated acid, approximately 2 to 3 times as much foam was observed on the apparatus walls in the disengaging space C and in the entrainment separator.

*Example 2*

To demonstrate the applicability of the invention to other methods of heating phosphoric acid, a sample of wet-process acid comparable to the acid employed in the previous example was concentrated to a 67 weight percent $P_2O_5$ content in a laboratory batch process by placing it in an externally heated container and evaporating the water. Prior to evaporation, the acid was ammoniated to an ammonia content of 0.902 weight percent. Semi-quantitative measurements showed that the foam reduction was about 30 to 50 percent and the foam which did form dispersed immediately upon cessation of heating. The product quality was also improved as the content of the black particulate matter was reduced by about 67 percent. The final product contained 0.56 weight percent nitrogen calculated as ammonia.

The preceding examples are for illustration only and are not to be construed as unduly limiting the invention which comprises the addition of ammonia or ammonium salts to phosphoric acid containing organic impurities prior to heating said acid to avoid foaming during the heating step.

I claim:
1. The method of concentrating a dilute phosphoric acid containing dissolved metal impurities comprising iron, aluminum and magnesium and organic impurities which tend to cause foaming of said acid upon heating which comprises: adding to said acid a material selected from the group consisting of ammonia, ammonium sulfate, ammonium nitrate, monoammonium phosphate, diammonium phosphate, ammonium carbonate, ammonium chloride, ammonium bromide, ammonium silicate and mixtures thereof in an amount sufficient to provide a nitrogen content between about 0.25 and about 5.0 weight percent in said acid and insufficient to precipitate said dissolved metal impurities, concentrating said acid by heating to remove water therefrom and recovering a concentrated phosphoric acid having at least 67 weight percent phosphorus calculated as $P_2O_5$ and containing said dissolved metal impurities.
2. The method of claim 1 wherein said heating comprises passing hot combustion gases into direct contact with said acid.
3. The method of claim 1 wherein said material is ammonia.
4. The method of claim 1 wherein said material is diammonium phosphate.
5. The method of claim 1 wherein said material is monoammonium phosphate.

References Cited in the file of this patent
UNITED STATES PATENTS

| | | |
|---|---|---|
| 1,115,044 | Washburn | Oct. 27, 1914 |
| 1,648,137 | Larison | Nov. 8, 1927 |
| 2,022,050 | Levermore | Nov. 26, 1935 |